July 28, 1970  SEIICHI KAGAYA  3,522,364
CAPACITOR TYPE TERMINAL FOR ELECTRIC CABLES
Filed July 8, 1968

Seiichi Kagaya
BY
INVENTOR.

United States Patent Office 3,522,364
Patented July 28, 1970

3,522,364
CAPACITOR TYPE TERMINAL FOR ELECTRIC CABLES
Seiichi Kagaya, Tokyo, Japan, assignor to The Fujikura Cable Works Limited, Tokyo, Japan, a corporation of Japan
Filed July 8, 1968, Ser. No. 743,184
Claims priority, application Japan, July 13, 1967, 42/60,138
Int. Cl. H02g 15/02; H01b 17/28
U.S. Cl. 174—73                                       1 Claim

ABSTRACT OF THE DISCLOSURE

A capacitor type terminal in which a capacitor element consisting of cylindrical capacitor foil electrodes disposed in a progressively stepped concentric fashion in an insulating reinforcing tubular layer is transversely split in at least two parts such that one of the electrodes is also split in two pants.

---

The present invention relates to a capacitor type terminal for electric cables having a split capacitor core. The capacitor type bushing is usually used for uniformalising the potential distribution of the bushing. This capacitor type bushing is of a construction consisting of an elongated conductor which is surrounded, for instance, by a tapered capacitor element. This type of capacitor element is fabricated in the factory by winding an insulating paper sheet into a tubular form and incorporating capacitor electrodes at predetermined positions in the form of a tubular foil in the course of winding of the insulating sheet such that they form a successively stepped configuration. This capacitor element is mounted upon the cable insulating layer at the location of installation.

Where the rated voltage of the conductor cable is high, however, a correspondingly long capacitor element with an insulating layer of a large wall thickness is required. Consequently, the manufacture of the element takes a long time for the impregnating and drying operation. Also, the long capacitor element is very troublesome to mount upon the conductor cable.

The invention is intended to eliminate the aforementioned defects by the provision of the capacitor type bushing having a plurality of split capacitor elements which are prefabricated in the factory and the parts of which are successively mounted upon the insulated conductor and electrically connected to each other to form a unit capacitor element.

According to the invention, the time required for impregnating and drying operations in the manufacture of the capacitor element is minimised and the mounting of the capacitor element upon the insulated conductor at the location of installation may be facilitated.

Figure 1:
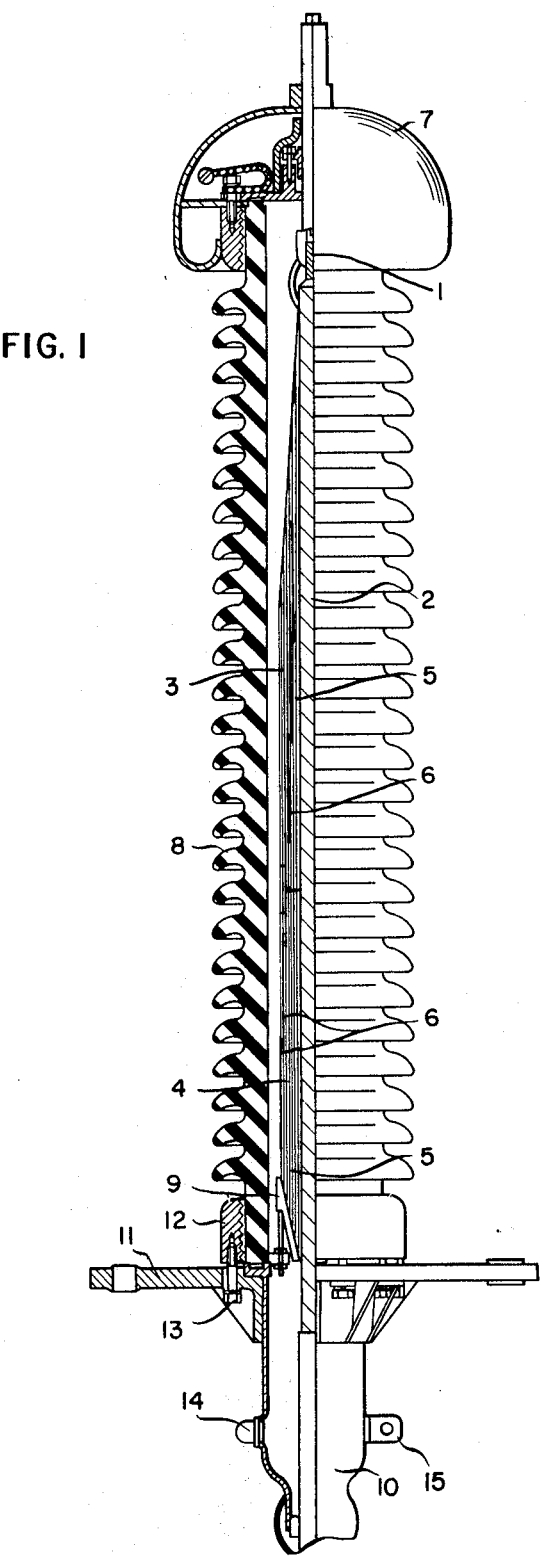
Figure 2:
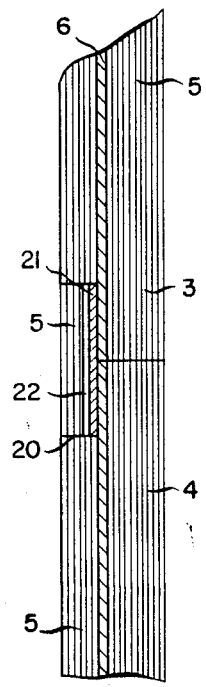

There will now be described the present invention by reference to the appended drawing in which:

FIG. 1 illustrates one embodiment of the capacitor type terminal according to the invention, partly in longitudinal elevation and partly in longitudinal section; and FIG. 2 is a fragmentary section illustrating a part of the capacitor element of FIG. 1.

Referring now to FIG. 1, the reference numeral 1 indicates a cable on which is wound an insulating tape 2 on which is in turn mounted a capacitor element half 3 which is tapered at one end and the other capacitor element half 4 which is also tapered at its end opposite the end meeting the associated end of the element half 3. Each of the capacitor element halves 3 and 4 consists of a tubular insulating layer formed by winding an insulating tape 5 and capacitor electrodes 6 in the form of a tubular foil incorporated at predetermined positions in the course of winding the insulating tape 5 into a successively stepped configuration as a whole. One end of the cable conductor 1 is secured to a cover 7 made of brass to which is also secured an insulating bushing 8 surrounding the capacitor element halves 3 and 4. The free tapered end of the capacitor element half 4 is held in position by means of stopper of aluminium moulding 9. The end of the cable sheath is secured to a cylindrical copper member 10 which is secured, by means of a bolt 13, to a circular bracket 11 secured to a support member 12 threadedly engaging the end of bushing 8. In the figure, the reference character 14 indicates a connector and 15 an earth terminal.

The engaging portions of the capacitor element halves 3 and 4 are then described. At the engaging ends of the split halves, the two parts of electrode 6 are in alignment with each other. The engaging ends of capacitor element halves are formed with peripheral notches 20 to form an annular groove, thus exposing the split electrode 6 on which is wound a conducting strip 21 to electrically connect the split halves of the electrode 6. On the outer surface of the conducting strip 21 in the form of a sleeve is wound an insulating member 22 on which is wound insulating tape 5, thus unifying the capacitor element halves.

Although the above embodiment is concerned with the capacitor element being split into two pieces, it may consist of more than two pieces.

With the construction as has been described in the foregoing constituting a split capacitor element, the conventional drawbacks of longer time required for the impregnating and drying operations in the manufacture of the capacitor type bushing and the difficulty of mounting the capacitor element on the insulated conductor are improved.

What is claimed is:

1. In a capacitor type terminal for an electric cable including an insulated conductor and a capacitor element, the improvement therein wherein said capacitor element comprises cylindrical capacitor foil electrodes disposed in a progressively stepped concentric fashion forming a reinforcing tubular layer, and is transversely split into two parts, one of the capacitor electrodes (6) being split into two abutting sections, each section belonging to one of the parts and being exposed with the reinforcing tubular layers thereof stripped off at the peripheral portions adjacent to said abutting portions of the electrodes, a conducting strip (21) wound over the exposed portions of said sections so that the sections are electrically connected to each other, and, an insulating tape (5) wound over said conducting strip and integrally connecting the respective sections to each other.

References Cited

UNITED STATES PATENTS

| 984,129 | 2/1911 | Fortescue | 174—143 |
| 2,606,950 | 8/1952 | Macardier | 174—143 X |

FOREIGN PATENTS

| 453,130 | 11/1927 | Germany. |

LARAMIE E. ASKIN, Primary Examiner

U.S. Cl. X.R.
174—143